April 14, 1953  W. A. SHERBONDY  2,634,692
KITCHEN UTENSIL
Filed April 14, 1949  2 SHEETS—SHEET 1
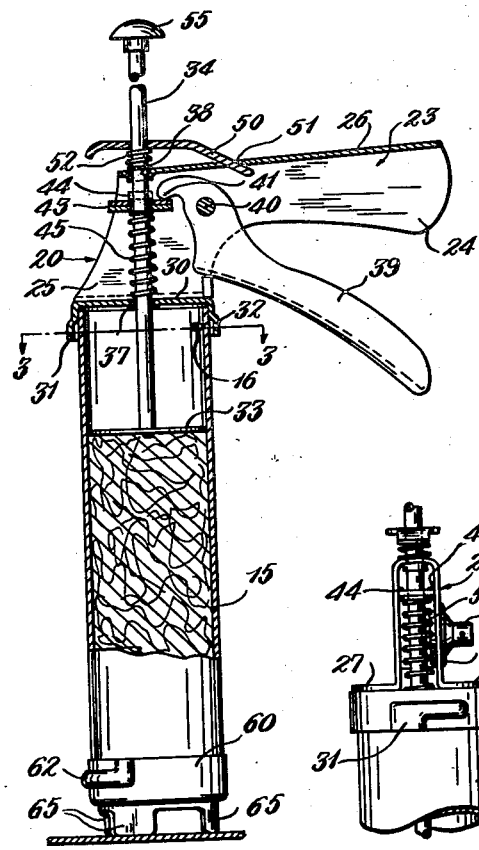
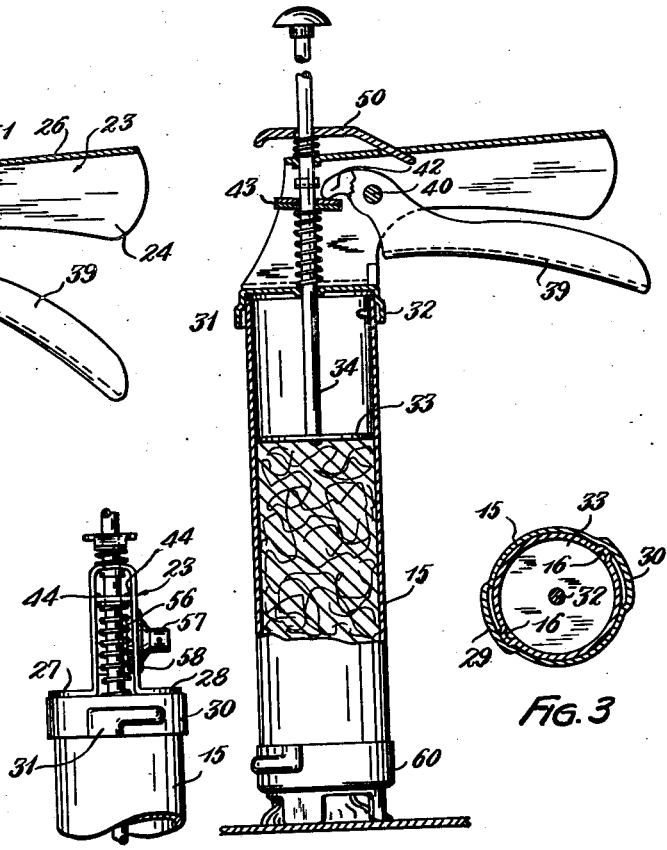
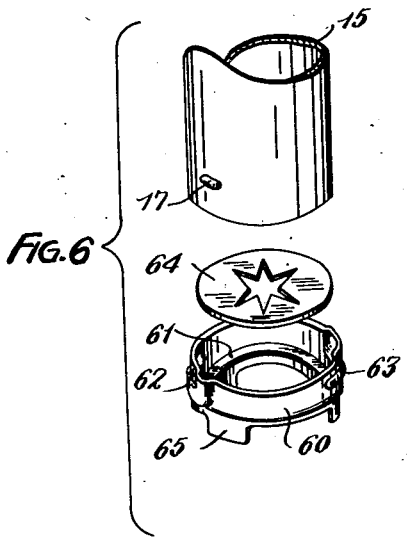
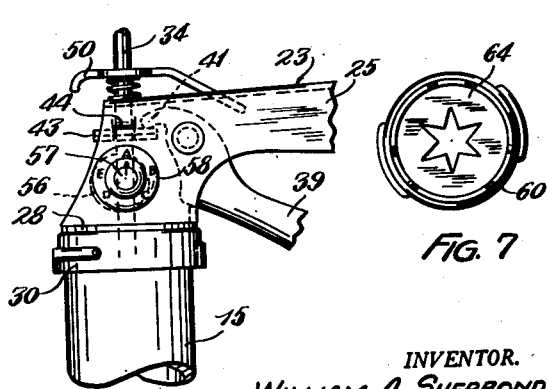
INVENTOR.
WILLIAM A. SHERBONDY
BY Hudson, Boughton,
Williams, David & Hoffmann.
ATTORNEYS April 14, 1953     W. A. SHERBONDY     2,634,692
KITCHEN UTENSIL
Filed April 14, 1949                                  2 SHEETS—SHEET 2
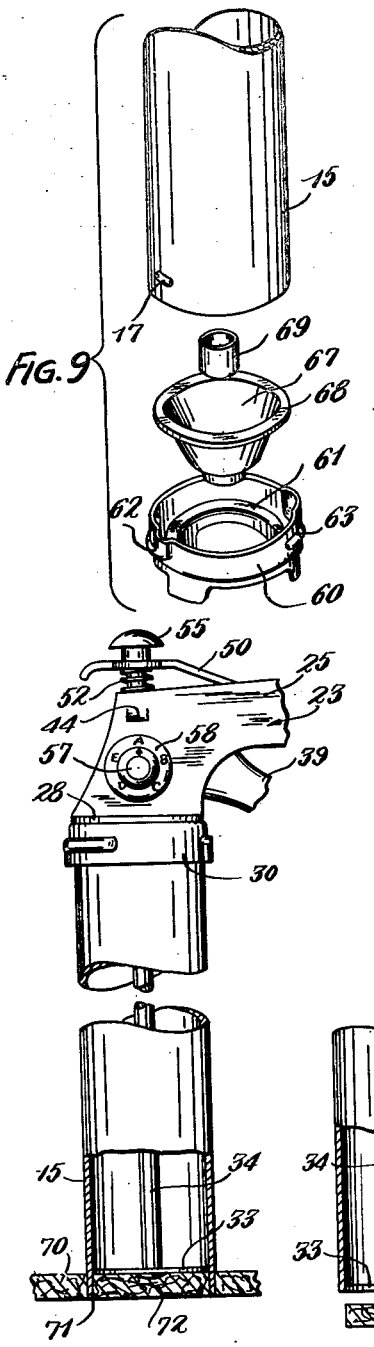
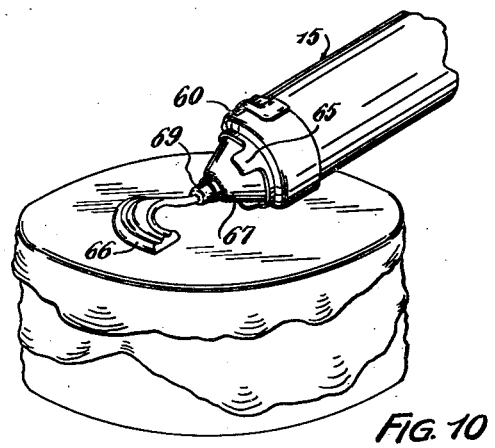
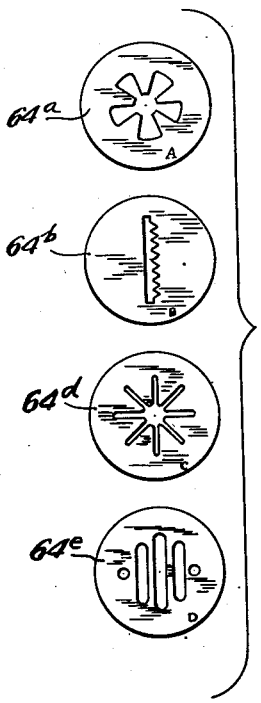
INVENTOR.
WILLIAM A. SHERBONDY
BY Hudson, Boughton,
Williams, David & Hoffmann.
ATTORNEYS

Patented Apr. 14, 1953

2,634,692

UNITED STATES PATENT OFFICE 2,634,692

KITCHEN UTENSIL

William A. Sherbondy, Shaker Heights, Ohio

Application April 14, 1949, Serial No. 87,438

4 Claims. (Cl. 107—52)

1

The present invention relates to kitchen utensils and, more particularly, to a kitchen utensil for quickly and accurately forming pastry articles, such as cookies, biscuits, canapes, and the like, and for extruding ribbons of icing or pastry for decorative purposes.

A principal object of the present invention is the provision of a new and improved, manually operable, pastry dispensing device comprising a tubular member or barrel adapted to contain a quantity of pastry material, a nozzle at one end of said tubular member, and a piston within the tubular member and movable in steps therein to eject a desired quantity of the material through the nozzle by a manually operated member, preferably of the trigger type operatively connected to the piston rod.

Another principal object of the invention is the provision of a novel and improved, pastry dispensing device having the construction referred to in the preceding object, and which includes means for adjusting the stepping mechanism for the piston within a certain range, whereby a variable predetermined amount of material is ejected upon each operation thereof.

Another principal object of the invention is the provision of a novel and improved, kitchen utensil for forming cookies, biscuits, canapes, and the like, which utensil comprises a tubular member or barrel having one end adapted for cutting cookies and like forms from pastry material, a piston or ejector member therein yieldingly maintained in a position slightly inwardly from the cutting end, and a manually operated member, preferably of the trigger type, for moving the piston to a position substantially flush with the cutting end of the tubular member to eject a cut form from the tubular member.

Still another object of the invention is the provision of a novel and improved, kitchen utensil comprising a tubular member or barrel having cutting edges at one end, a piston movable in the barrel to eject pastry material therefrom, a pastry dispensing nozzle structure detachably connected to the barrel at the end having the cutting edges, and a handle for the barrel, including a mechanism, preferably of the trigger type, operatively connected to the piston for moving the piston step-by-step in the barrel and for reciprocating the piston in the barrel when it is adjacent to the end of the barrel having the cutting edges, whereby the utensil may be used either to dispense pastry material contained within the barrel or as a cookie, etc., cutter.

A still further object of the invention is the provision of a novel and improved utensil of the character referred to, which will be convenient to handle and operate and which may be readily disassembled to facilitate cleaning, etc.

The invention resides in certain constructions and combinations and arrangements of parts and further objects and advantages will be apparent

2 to those skilled in the art to which it relates from the following description of the preferred embodiment described with reference to the accompanying drawings forming a part of this specification in which Fig. 1 is a side elevational view of a combination pastry dispenser and cookie cutter, partly in section, showing the positions of the parts thereof preparatory to dispensing pastry material, such as cookie dough, or the like, onto a baking surface;

Fig. 2 is a view similar to Fig. 1 showing the position of the parts at the termination of the dough dispensing operation;

Fig. 3 is a sectional view taken on line 3—3 of Fig. 1;

Fig. 4 is a front elevational view of the upper part of the utensil shown in Fig. 1;

Fig. 5 is a fragmentary, side elevational view of the upper part of the utensil shown in Fig. 1;

Fig. 6 is a fragmentary, perspective, exploded view of the discharge end of the utensil shown in Fig. 1, showing the nozzle structure;

Fig. 7 is an end view of the discharge end of the utensil shown in Fig. 1;

Fig. 8 is a plan view of a plurality of different dies for use in the nozzle structure shown in Fig. 6;

Fig. 9 is a view similar to Fig. 6 but showing another form of nozzle structure;

Fig. 10 is a perspective view showing the application of icing to a cake, using the nozzle structure shown in Fig. 9;

Fig. 11 is an elevational view with part of the barrel broken away, showing the device being used as a biscuit, canape or cookie cutter; and Fig. 12 is a view similar to Fig. 11 but showing a cut form being ejected from the barrel.

In general, the kitchen utensil of the present invention comprises a tubular member or barrel adapted to contain a quantity of pastry material, such as, cookie dough or cake icing, a piston slidably supported in the barrel for advancing the pastry material therein through the same, a piston rod connected to the piston and projecting from the rear end of the barrel, and a movable member, preferably a trigger-like device, operatively connected to the piston rod for advancing the piston through the barrel in a series of steps, preferably of predetermined, adjustable length, or for merely reciprocating the piston adjacent to the discharge end of the barrel. In the first instance, the utensil is provided at the discharge end of the barrel, with a removable nozzle structure having interchangeable dies so that the pastry material ejected therefrom may be deposited upon a desired surface in various distinctive forms. In the second instance, the discharge end of the barrel is left open and the utensil is adapted for use as a cookie, canape, or like cutter, that is, for cutting pastry forms from sheet-like pastry material. When adapted for this purpose, the end of the barrel may be pressed into the pastry material and the cut form which sticks in the end of the barrel may be ejected by actuation of the piston.

Although the invention may be embodied in various forms, for the purpose of illustration, it is herein shown and described as embodied in a combination pastry dispenser and cutter, which is the preferred arrangement or form.

Referring to the drawings, the reference character 15 designates a tubular body member or barrel which may be formed of any suitable material, such as aluminum tubing. The upper and lower ends of the barrel 15 are provided with pairs of opposed lugs 16, 17 formed thereon, as by pressing portions of the wall outwardly, which lugs are spaced equally from the ends of the barrel and form elements of a bayonet connection employed to detachably connect a combined handle and piston assembly, designated generally as 20, to the upper or rear end and a nozzle assembly to the lower or front end in the event one is used.

The combined handle and piston assembly 20 comprises a channel-shaped, sheet metal member 23 having two side walls 24, 25 and an interconnecting, rear wall 26 which member 23 forms the handle proper. The forwardly facing, free edges of the side walls 24, 25 of the member 23 are curved to form a pistol-shaped hand grip and the ends thereof adjacent to the barrel 15 project forwardly and terminate in out-turned flanges 27, 28 by means of which they and, in turn, the member 23 are attached to the upper wall of an inverted cup-shaped member 30. The cup-shaped member 30 is adapted to telescopingly receive either end of the barrel 15 and the barrel may be quickly attached to and detached therefrom by the bayonet-type connections formed by the pairs of lugs 16 or 17, as the case might be, and two opposed, L-shaped grooves 31, 32 formed on the inside of the side walls of the member 30. One end of each of the grooves 31, 32 extends at right angles to the main part thereof and opens into the free or lower edge of the member 30 for receiving either of the sets of lugs on the barrel 15. The lugs in the barrel cooperate with the walls of the grooves in the member 30 in the usual manner to hold the barrel within the flange of the member 30 when the barrel is inserted therein and rotated.

In addition to the members 23 and 30 described, the combined handle and piston assembly comprises a piston 33 fixed to the lower end of a piston rod 34 and normally located within the barrel 15 and moved therein to eject pastry material or form from the barrel. The piston rod 34 extends through two aligned openings 37, 38 formed in the center of the member 30 and the rear wall 26 of the member 23, respectively. The metal about the openings 37, 38 is preferably drawn a slight amount to form guides for the piston rod 34.

The piston rod 34 is adapted to be moved into the barrel 15 by a trigger 39 pivoted by a pin 40 between the side walls 24, 25 of the handle member 23. The trigger 39 shown is formed of a channel shaped, sheet metal member having two parallel fingers or projections 41, 42 formed integral with the sides thereof at its pivoted end. The fingers 41, 42 engage the upper or rear side of a two plate friction grip device 43 surrounding the piston rod 34 intermediate the rear wall 26 of the member 23 and the member 30. The two grip plates 43 have central, aligned openings which loosely receive the piston rod 34 therethrough. The plates 43 are normally urged against stops 44, in the form of projections struck inwardly from the sides 24, 25 of the handle or grip member 23, by a compression spring 45 interposed between the member 30 and plates 43. By drawing the trigger 39 toward the handle member 23, the fingers 41, 42 cant the grip plates 43 relative to the piston rod 34, causing the edges of the openings therethrough to grip the piston rod and move it into the barrel. When the trigger 39 is released, it is returned to its original position along with the grip plates 43 by the spring 45.

The piston rod 34 is normally held against rearward movement during the return of the grip plates 43 to their starting position and, in fact, at all times by a one-way clutch or lock formed by a metal strip 50 located at the rear of the handle member 23. This strip has a central opening which loosely receives the piston rod while an end of the strip extends into an opening 51 in the rear wall 26 of handle member 23. A coil spring 52 interposed between the wall 26 and the strip 50 presses the strip to normally maintain the latter in a position such that the axis of the opening therethrough is canted relative to the piston rod whereby the piston rod is gripped by the edges of the opening and rearward movement thereof prevented. Movement of the member 50 outwardly or to the rear is prevented by engagement of the end thereof inserted through opening 51 with the wall 26. The piston rod 34 is free to move into the barrel, however, as the strip 50 is tilted forwardly by forward movement of the piston rod whereupon the piston rod is free to move therethrough. When the piston 33 reaches a position near the discharge end of the barrel 15, such as, approximately one-quarter of an inch therefrom, a knob 55 at the outer or rear end of the rod 34 engages the strip 50 and moves the same against the force of the spring 52 when the trigger 39 is drawn toward the handle member 23 by the operator. When this occurs, the strip 50 merely reciprocates with the piston rod 34 and the piston 33 can be reciprocated between its position adjacent to the lower end of the barrel and a position flush with the lower end of the barrel upon each actuation of the trigger member. The piston rod may be withdrawn from the barrel 15 manually by pressing the strip 50 forwardly against the action of the spring 52 to align the axis of the opening through the strip 50 with the axis of the piston rod. The withdrawal of the piston rod 34 from the barrel 15 is facilitated by the provision of the knob 55 on the rod.

The distance which the piston rod 34 may be moved upon each stroke or actuation of the trigger 39 toward the handle member 23 may be limited in various ways, and as shown, an adjustable stop is provided for limiting the forward travel of the grip plates 43. This stop comprises a rotatable cam 56 journalled in the side wall 25 of the member 23, the periphery of which cam is engageable by the front face of the forward plate of the grip plates 43. The cam 56 is rotatable by a knob 57 at the exterior of the wall 25 to bring different portions of the cam in position for engagement by the grip plates. Preferably, the knob 57 has a pointer thereon which cooperates with indicia on a dial 58 formed on the adjacent wall 25 for indicating the setting of the cam. By this arrangement, the operator can predetermine the amount of pastry material which will be discharged for each operation of the trigger 39.

When the utensil is to be used as a pastry material dispenser, as distinguished from a cookie cutter, the forward or lower end of the barrel 15 is provided with a nozzle assembly. If pastry material for making cookies and the like is to be dispensed, a nozzle assembly similar to that shown in Figs. 1, 2 and 6 is used. The nozzle assembly referred to comprises an annular collar member 60 having an inwardly extending flange adjacent to its lower end which forms an internal, circular shoulder 61. Two opposed, L-shaped grooves 62, 63 are formed in the collar 60 for receiving either of the sets of lugs 16 or 17, as the case may be, for attaching the collar to the lower or front end of the barrel 15 in a manner similar to that in which the member 30 is attached to the other end of the barrel. A die disk 64 is disposed between the shoulder 61 and the end of the barrel 15 and the disk has an opening through which the pastry is forced. The outline of the opening is such that it gives the dough a distinctive form as it is deposited on a baking surface. Three axially extending lugs 65 on the collar 60 and extending downwardly from the flanged end thereof form feet for spacing the die disk 64 above the surface upon which the pastry material is to be deposited a distance at least equal to the depth of the unbaked pastry dispensed.

It is desirable in many instances to extrude pastry from the barrel in different forms depending upon the type of pastry being prepared, and for this purpose any one of a number of die disks, each having different shaped openings therethrough, may be substituted for disk 64. Several different disks 64a, 64b, 64c, 64d are shown in Fig. 8, and other disks having still different shaped openings can be employed. The amount of pastry material which should be dispensed upon each actuation of the trigger 39 depends, among other things, upon the size of the opening in the particular die disk employed and, for the purpose of facilitating the setting of the cam 56 to obtain the proper stroke of the piston 33 for any given disk, each disk, preferably, bears an indicia corresponding to indicia on the dial 58 which indicates the proper setting of the cam knob 57 for that particular disk. The indicia shown, by way of example, is "A" "B" "C" "D" and "E" but the particular indicia given here is not necessarily correct for the form of disks shown.

Cake icings and the like may be dispensed in the form of a ribbon 66, as shown in Fig. 10, by substituting a funnel-shaped member 67 for the disk 64 in the nozzle structure already described. The member 67 has a peripheral flange 68 which is adapted to rest on the shoulder 61 of the collar 60. The apex of the member 67 is open for frictionally receiving a tapered, thimble-like die member 69 having an opening formed to impart a distinctive shape to the pastry material as it is extruded therethrough. The end of the member 67 extends beyond the spacer lugs 65 so that the extruded material may be deposited on the surface in a continuous ribbon. Any number of thimbles similar to the thimble 69 may be provided, each having a different shaped opening.

In addition to dispensing pastry material in the form of cookies and the like, or icings in ribbon form, etc., the utensil may be used for cutting pastry forms, such as, cookies, canapes, and the like, from a sheet of pastry material. When used for this purpose, the nozzle assembly is removed from the lower end of the barrel so that it may be pressed into a sheet of pastry in the manner shown in Fig. 11, in which figure the end of the pastry is indicated by 70. The end of the barrel is preferably beveled as indicated at 71 to form a sharp cutting edge and the shape of the pastry form cut will correspond to the cross-sectional shape of the barrel which, of course, may be of any suitable form. When the piston rod 34 is moved or advanced to a position where the knob 55 engages the clutch strip 50, see Fig. 11, the piston 33 is spaced approximately one quarter of an inch or so from the open end of the barrel 15 and when the trigger 39 is drawn towards the handle 23, as far as possible, with the parts in the position referred to and the knob 57 adjusted for a maximum stroke of the piston rod, the piston is advanced to a position substantially flush with the outer end of the barrel, as shown in Fig. 12, and if a cut pastry form such as that shown in Fig. 12 and indicated by 72 is within the end of the barrel, it is ejected from the barrel. During the movement of the piston to eject the cut pastry from the barrel, the strip 50 is moved forwardly to the rod releasing position by the knob 55, and when the trigger 39 is released, it is moved, as a unit, with the piston rod, piston, and trigger outwardly by the springs 44, 52 to again position the piston 33 slightly inwardly of the cutting end of the barrel. The construction is such that the piston can be reciprocated between a position adjacent to but spaced slightly inwardly of the outer end of the barrel and a position in which it is substantially flush with the end of the barrel, see Figs. 11, 12 by merely reciprocating the trigger, thereby permitting cookies, canapes, biscuits and the like to be quickly cut from a sheet of pastry and deposited onto any desired surface.

It will be appreciated that the construction of the utensil is such that it may be readily disassembled and easily cleaned. The reassembling may be accomplished with a minimum of skill and the manner in which the various elements are assembled is obvious. By providing the adjustable cam stop for the piston actuating mechanism, the formation of cookies and biscuits may be accomplished speedily and uniformly and the proper amount of dough for the different pastry items to be made can be quickly determined and dispensed. The pistol-type hand grip and the trigger-like element for actuating the piston enable the utensil to be manipulated with the utmost ease and convenience.

Although in the preferred form of the invention, the utensil may be used as a pastry material dispenser, as well as a cookie, biscuit, canape, or the like cutter, it may be constructed solely as a cookie or pastry cutter, in which event the cross-sectional shape of the barrel and the piston may be varied, as desired, the relative length of the barrel and piston rod decreased, and the clutch strip 50 eliminated. In such modified form, the piston would merely be reciprocated adjacent to the pastry cutting end of the barrel to eject the individually cut pastry forms from the barrel onto any desired surface.

It is to be understood that the invention is not limited to the preferred construction shown and described in detail, and it is my intention to cover hereby all adaptations, modifications and changes therein which come within the practice of those skilled in the art to which the invention relates and the scope of the appended claims.

Having thus described the invention, I claim:

1. In a kitchen utensil of the character referred to, the combination of a tubular body member adapted to contain a quantity of pastry material, a pistol-type handle fixed to said body member adjacent one end thereof, a piston movable in said body member, a piston rod connected to said piston and projecting from the said one end of said body member, and means including a manually operable trigger-like member adjacent to said handle and operatively connected to said piston rod for moving said piston in steps toward said nozzle assembly for ejecting pastry material therethrough, a spring to urge said trigger in one direction, a stop to limit movement of said trigger by said spring, a cam pivotally connected to said handle and positioned to have the cammed surface thereof engaged by a part of said means during movement of said piston into said tubular body by movement of said trigger in the direction opposite to said one direction for limiting the movement of said last-named means whereby a maximum variable predetermined quantity of pastry material may be ejected upon each actuation of said trigger-like member, a handle for adjusting said cam, and indicia for indicating the position of said cam.

2. In a kitchen utensil of the character referred to, the combination of a tubular member adapted to contain pastry material, a pistol type handle assembly at one end of said member, said assembly including a U-shape wall structure, a piston rod movable longitudinally into said tubular member and between opposite walls of said wall structure, a piston attached to said rod and movable in said tubular member, a trigger member pivoted between the opposed walls of said wall structure, a one-way clutch device operatively connecting said trigger-like member to said piston rod and adapted to move said rod in one direction when said trigger member is moved in one direction about its pivot, a spring urging said clutch and trigger opposite to said one direction, a stop to limit movement of said clutch and trigger by said spring, a cam rotatably journalled on the interior of said wall structure and on an axis extending transversely of said rod and having its periphery engageable by said clutch device when said trigger member is moved in said one direction about its pivot to limit movement of said clutch device and rod in said one direction, and means accessible from the exterior of said wall structure for rotatably positioning said cam.

3. In a kitchen utensil of the character referred to, the combination of a tubular body member adapted to contain pastry material, and a pistol type handle assembly at one end of said body member, said assembly comprising a hand grip having a rear wall and two spaced parallel walls extending forwardly of the rear wall, said rear wall having an aperture therein, a piston rod extending through the aperture in said rear wall and between said spaced walls and into said tubular body member, a trigger pivoted to said assembly and having a part movable generally longitudinally of said rod when said trigger is reciprocated, a one way clutch between said spaced walls and interconnecting said piston rod and trigger and operative to connect said trigger with said piston rod to move said rod in one direction when said trigger is moved in one direction about its pivot, a spring connected with said clutch to urge said clutch opposite to said one direction of movement of said rod, stop means limiting movement of said clutch by said spring, a cam pivotally supported between the said spaced walls and having the periphery thereof engageable by a part of said clutch when said trigger is actuated to move said rod in said one direction to limit the stroke of said piston rod, and means to selectively position said cam about its pivot.

4. In a kitchen utensil of the character described, the combination of a tubular body member having a dough cutting edge at one end thereof, means on said member adjacent the said one end thereof and spaced inwardly therefrom for detachably securing a nozzle assembly thereto, a piston movable axially in said body member and having a substantially planar surface on the side adjacent the said one end of the body member, a piston rod connected to said piston and projecting from the other end of said body member, a pistol-type handle fixed to said body member adjacent the said other end of the latter, plate-like means slidable on said piston rod and adapted to be canted relative to said rod to grip the latter, spring means acting on said plate-like means to urge the latter in a direction away from the said one end of the body member, a trigger-like lever pivotally supported on said handle and having a portion engaging said plate-like means for canting the latter into gripping engagement with said piston rod and movement of the latter and the piston towards the said one end of the body member each time the said lever is rocked in one direction, means including a rockable plate-like member engaging the said projecting portion of the piston rod between the outer end thereof and the said plate-like means and operative to prevent retrogressive movement of said piston and rod when the said trigger-like lever rocks in the direction opposite to said one direction whereby the said piston may be advanced step-by-step through said body member for sequential discharge of pastry material therein, and an abutment member on the said projecting portion of the piston rod outwardly of the said rockable member adapted to engage and move the latter to a position in which it no longer prevents retrogressive movement of said piston rod when the said lever is rocked while limiting movement of the said piston rod in the direction towards said one end of the body member to a predetermined amount, the distance of said abutment from said piston being such that when the abutment contacts the said rockable member the piston is adjacent the said one end of the body member but inwardly thereof and when the abutment and rockable member prevent further movement of the piston rod the outer face of the piston is coplanar with the edge of the said one end of the body member, whereby the said one end of the body member may be employed to cut portions from a sheet of dough with each cut portion being received within the outer end of the said body member and discharged therefrom by actuation of the said lever.

WILLIAM A. SHERBONDY.

References Cited in the file of this patent

UNITED STATES PATENTS

| Number | Name | Date |
|---|---|---|
| 554,550 | Thode | Feb. 11, 1896 |
| 1,526,112 | Blackaller et al. | Feb. 10, 1925 |
| 1,986,166 | Schneider | Jan. 1, 1935 |
| 2,101,075 | Krag | Dec. 7, 1937 |
| 2,314,401 | Johnson | Mar. 23, 1943 |
| 2,420,203 | Sherbondy | May 6, 1947 |